United States Patent
Li et al.

(10) Patent No.: US 10,965,367 B2
(45) Date of Patent: *Mar. 30, 2021

(54) AUTOMOTIVE COMMUNICATION SYSTEM WITH DIELECTRIC WAVEGUIDE CABLE AND WIRELESS CONTACTLESS ROTARY JOINT

(71) Applicant: Waymo LLC, Mountain View, CA (US)

(72) Inventors: Zhe Li, San Jose, CA (US); Min Wang, Santa Clara, CA (US); Michael Sleator, Woodside, CA (US)

(73) Assignee: Waymo LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/913,163

(22) Filed: Jun. 26, 2020

(65) Prior Publication Data

US 2020/0374000 A1    Nov. 26, 2020

Related U.S. Application Data

(63) Continuation of application No. 16/418,628, filed on May 21, 2019, now Pat. No. 10,742,315.

(51) Int. Cl.
  *H04B 7/26* (2006.01)
  *G01S 7/00* (2006.01)
  (Continued)

(52) U.S. Cl.
  CPC ........... *H04B 7/26* (2013.01); *B60R 16/0231* (2013.01); *G01S 7/003* (2013.01); *G01S 17/931* (2020.01);
  (Continued)

(58) Field of Classification Search
  CPC combination set(s) only.
  See application file for complete search history.

(56) References Cited

U.S. PATENT DOCUMENTS

| 2,713,151 A | 7/1955 | Farr |
| 3,668,567 A | 6/1972 | Rosen |

(Continued)

FOREIGN PATENT DOCUMENTS

| KR | 10-2018-0008601 A | 1/2018 |
| WO | 2019009874 A1 | 1/2019 |

OTHER PUBLICATIONS

International Searching Authority, International Preliminary Report on Patentability, dated Aug. 27, 2020, issued in connection with International Application No. PCT/US2020/033042.

*Primary Examiner* — Junpeng Chen
(74) *Attorney, Agent, or Firm* — McDonnell Boehnen Hulbert & Berghoff LLP (57) ABSTRACT

A communication system is disclosed. The system can include a first communication unit including a first antenna, a second communication unit including a second antenna and a dielectric waveguide cable, and a rotary joint configured to enable the first unit to rotate with respect to the second unit about an axis of rotation of the system. The dielectric waveguide cable can extend from the second antenna to the rotary joint, where a proximal end of the cable can be coupled to the second antenna and a distal end of the cable can be affixed to the second unit at a location bordering a space defined by the rotary joint. The first and second units can be configured to engage in two-way communication with each other. An axis of the distal end of the cable can be substantially aligned with the axis of rotation of the system.

20 Claims, 6 Drawing Sheets

(51) Int. Cl.
*H01Q 1/32* (2006.01)
*G01S 17/931* (2020.01)
*B60R 16/023* (2006.01)
*G05D 1/02* (2020.01)

(52) U.S. Cl.
CPC ......... *H01Q 1/3233* (2013.01); *H01Q 1/3291* (2013.01); *G05D 1/0214* (2013.01); *G05D 1/0274* (2013.01); *G05D 1/0278* (2013.01)

(56) References Cited

U.S. PATENT DOCUMENTS

| | | | |
|---|---|---|---|
| 4,757,281 A | 7/1988 | Anne et al. | |
| 6,489,855 B1 | 12/2002 | Kitamori et al. | |
| 9,979,061 B1 | 5/2018 | Droz et al. | |
| 2012/0235882 A1* | 9/2012 | Iverson | H01Q 3/02 343/905 |
| 2012/0242428 A1 | 9/2012 | Blech et al. | |
| 2013/0183902 A1 | 7/2013 | McCarthy et al. | |
| 2013/0285864 A1 | 10/2013 | Clymer et al. | |
| 2014/0145907 A1* | 5/2014 | Miyagawa | H01Q 3/04 343/878 |
| 2014/0145908 A1* | 5/2014 | Atsumi | H01Q 13/28 343/878 |
| 2015/0177377 A1* | 6/2015 | Moreira Neto | G01S 13/426 342/25 R |
| 2018/0166765 A1* | 6/2018 | Britz | H01Q 1/1228 |
| 2019/0118737 A1 | 4/2019 | Li et al. | |

\* cited by examiner

AUTOMOTIVE COMMUNICATION SYSTEM WITH DIELECTRIC WAVEGUIDE CABLE AND WIRELESS CONTACTLESS ROTARY JOINT

CROSS-REFERENCE TO RELATED APPLICATION

The present disclosure is a continuation of U.S. patent application Ser. No. 16/418,628, filed on May 21, 2019, and entitled "Automotive Communication System with Dielectric Waveguide Cable and Wireless Contactless Rotary Joint," the entire contents of which are herein incorporated by reference as if fully set forth in this description.

BACKGROUND

Unless otherwise indicated herein, the materials described in this section are not prior art to the claims in this application and are not admitted as prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the vehicle's directional controls to cause the vehicle to navigate around the obstacle.

One such sensor is a light detection and ranging (LIDAR) device. A LIDAR actively estimates distances to environmental features while scanning through a scene to assemble a cloud of point positions indicative of the three-dimensional shape of the environmental scene. Individual points are measured by generating a laser pulse and detecting a returning pulse, if any, reflected from an environmental object, and determining the distance to the reflective object according to the time delay between the emitted pulse and the reception of the reflected pulse. The laser, or set of lasers, can be rapidly and repeatedly scanned across a scene to provide continuous real-time information on distances to reflective objects in the scene.

LIDAR, and other sensors, may create large amounts of data. Thus, it may be desirable to communicate this data, or a variant of this data, to various systems of the vehicle.

SUMMARY

Disclosed are electrical devices that may be used for the communication of signals to and from the various sensors of the vehicle. For example, one or more sensors may be mounted on the roof of the vehicle, such as in a sensor dome. During the operation of the sensor, the sensor may be rotated, such as by way of being mounted on a rotating platform. Although the sensor and platform are rotating, it may be desirable for the sensor to be in data communication with components on the vehicle, such as a data processor associated with the sensor. Therefore, it may be desirable to have a system to communicate signals between the rotating sensor and the vehicle reliably.

Some embodiments of the present disclosure provide a communication system. The communication system can include a first communication unit, a second communication unit, and a rotary joint configured to enable the first communication unit to rotate with respect to the second communication unit about an axis of rotation of the communication system. The first communication unit can comprise a first antenna. The second communication unit can comprise a second antenna. The second communication unit can also comprise a dielectric waveguide cable extending from the second antenna to the rotary joint. A proximal end of the dielectric waveguide cable can be coupled to the second antenna and a distal end of the dielectric waveguide cable can be affixed to the second communication unit at a location bordering a space defined by the rotary joint. The first communication unit and the second communication unit can be configured to engage in two-way communication with each other. First electromagnetic signals transmitted from the first antenna to the second antenna can enter the distal end of the dielectric waveguide cable following propagation of the first electromagnetic signals across the rotary joint. Second electromagnetic signals transmitted from the second antenna to the first antenna can exit the distal end of the dielectric waveguide cable into the rotary joint. An axis of the distal end of the dielectric waveguide cable can be substantially aligned with the axis of rotation of the communication system.

Some embodiments of the present disclosure provide a method. The method can involve transmitting, by a first antenna of a first communication unit, first electromagnetic signals across a rotary joint and into a distal end of a dielectric waveguide cable. The dielectric waveguide cable can extend from the rotary joint to a second antenna of the second communication unit. A proximal end of the dielectric waveguide cable can be coupled to the second antenna and the distal end of the dielectric waveguide cable can be affixed to the second communication unit at a location bordering a space defined by the rotary joint. The method can also involve coupling, by the dielectric waveguide cable, the first electromagnetic signals to the second antenna. The first communication unit and the second communication unit can be configured to engage in two-way communication with each other. The rotary joint can be configured to enable the first communication unit to rotate with respect to the second communication unit about an axis of rotation, and an axis of the distal end of the dielectric waveguide cable can be substantially aligned with the axis of rotation.

Some embodiments of the present disclosure provide a vehicle. The vehicle can include a sensor unit rotationally mounted to the vehicle, a vehicle-side communication unit, and a rotary joint configured to enable the sensor unit to rotate with respect to the vehicle-side communication unit about an axis of rotation. The sensor unit can comprise a first antenna. The vehicle-side communication unit can comprise a second antenna. The vehicle-side communication unit can also comprise a dielectric waveguide cable extending from the second antenna to the rotary joint. A proximal end of the dielectric waveguide cable can be coupled to the second antenna and a distal end of the dielectric waveguide cable can be affixed to the vehicle-side communication unit at a location bordering a space defined by the rotary joint. The first communication unit and the second communication unit can be configured to engage in two-way communication with each other. First electromagnetic signals transmitted from the first antenna to the second antenna can enter the distal end of the dielectric waveguide cable following propagation of the first electromagnetic signals across the rotary joint. Second electromagnetic signals transmitted from the second antenna to the first antenna can exit the distal end of the dielectric waveguide cable into the rotary joint. An axis of the distal end of the dielectric waveguide cable can be substantially aligned with the axis of rotation.

These as well as other aspects, advantages, and alternatives, will become apparent to those of ordinary skill in the art by reading the following detailed description, with reference where appropriate to the accompanying drawings.

DETAILED DESCRIPTION

I. Overview

During operation of a vehicle, signals can be communicated between various sensors of a sensor system of a vehicle and associated sensor processors. For example, one or more sensors may be included in a sensor unit. Hereinafter, the term "sensor unit" will be used to refer to a rotating platform that is rotationally mounted to the vehicle, such as on a roof or other location of the vehicle. The rotating platform can include various communication chips (e.g., microchips), sensors, and other electronics that provide sensing of an environment of the vehicle and also facilitate communication of signals (e.g., radio frequency waves) between the sensors in the sensor unit and components on the vehicle, such as a vehicle-side communication unit.

During the operation of the sensor unit, the sensor unit may be rotated (e.g., 360°) about a vertical axis. Although the sensor unit can be rotating, it may be desirable for the sensor unit to be in communication with the vehicle-side communication unit. Therefore, it may be desirable to have a system that can reliably communicate signals between the rotating sensor unit and the vehicle, without the need for a physical connection between the vehicle and the sensor unit.

Thus, disclosed is a communication system that can include a first communication unit, a second communication unit, a rotary joint, and a dielectric waveguide cable configured to facilitate two-way (or, in some implementations, one-way) communication between the first and second communication units. The first communication unit can include or take the form of the sensor unit described above that is rotationally mounted to a vehicle. Thus, the term "first communication unit" and "sensor unit" will be used interchangeably herein. The second communication unit (also referred to herein as the "vehicle-side communication unit," or "vehicle-side unit" for short) can be a communication unit that is located on the vehicle, such as a computing device or other electronics that are configured to communicate with the sensor unit. The sensor unit and the vehicle-side unit can each include a respective antenna configured to transmit and receive electromagnetic signals.

The vehicle-side unit can include the dielectric waveguide cable. The dielectric waveguide cable can terminate at the rotary joint, and function as a waveguide that facilitates communication of electromagnetic signals (i.e., electromagnetic energy) between the sensor-side antenna and the vehicle-side antenna. In some examples, the electromagnetic signals transmitted between the sensor unit and the vehicle-side unit can take the form of electromagnetic energy having a wavelength between 50 and 100 Gigahertz (GHz). In other examples, the electromagnetic signals can have different frequencies. Further, in some examples, the dielectric waveguide cable can be a flexible, plastic cable. In other examples, the cable can be comprised of one or more materials other than plastic.

Herein, a "rotary joint" may refer to a mechanism, or a lack thereof, that can enable the sensor unit to rotate with respect to the vehicle (and thus, to the second communication unit), and can also enable electromagnetic energy to propagate between the two units, without resulting in any undesirable signal loss. In essence, the rotary joint can act as a contactless electrical coupling between the sensor unit and the vehicle-side unit, and the rotary joint and the dielectric waveguide cable can together electrically couple the first antenna to the second antenna. In some examples, the rotary joint can take the form of one or more rotational bearings (or another type of mechanical element that enables rotation) and can provide an air gap between the end of the dielectric waveguide cable and the chip on the rotating platform (e.g., an air gap equaling approximately 2 millimeters (mm)). It may be desirable to make the air gap as small as possible, however, due to physical tolerances and machining tolerances, it may not be practical to make the air gap smaller than 0.2 to 0.5 mm. On the other hand, in some examples, an air gap of a few millimeters may function well within examples (i.e., an air gap up to 5 mm).

The disclosed communication system can provide various advantages in the context of vehicle communications. For example, the dielectric waveguide cable can be a less costly (e.g., compared to materials such as copper), less complex, less heavy, more reliable, and less bulky alternative to some existing waveguide apparatuses. In addition, the dielectric waveguide cable can reduce signal interference by reducing the quantity of air gaps or other structural elements present in the communication system (e.g., traces on a printed circuit board (PCB)) that can be susceptible to the presence of undesired outside signals. For example, some existing communication systems can have up two or more air gaps, whereas the disclosed communication system can include one air gap—namely, the air gap between a distal end of the dielectric waveguide cable and the first antenna on the sensor unit. In the disclosed communication system, electromagnetic signals can propagate uninterfered with (or minimally interfered with) throughout the length of the dielectric waveguide cable, which can be a longer distance than in some existing systems. Moreover, because a vehicle may be an electromagnetically noisy environment, the dielectric waveguide cable may be shielded to prevent electromagnetic interference from being coupled into the cable along its length.

Furthermore, by using the dielectric waveguide cable, the burden of electrical-to-RF and RF-to-electrical conversion can be moved away from the rotary joint. In particular, the vehicle-side antenna (and any chip(s) or other electronics that facilitate operation of the vehicle-side antenna and such conversions) can be placed at (e.g., on, inside, or nearby to) vehicle-side processor(s), such as in a computing device designated for vehicle control and/or signal processor(s) for the vehicle's sensor system. Thus, communication from the sensor unit to the vehicle-side unit (or vice versa) can eliminate the need for such conversions to occur near the rotary joint.

In the disclosed system, the communication chip can be physically located on the same PCB as the main vehicle computer (e.g., processor), so the interface between the chip and the computer can be a parallel arrangement of many PCB traces, each carrying signals at a lower rate, as compared to a situation where the chip is located near the rotary joint and a long cable run is needed between the chip and computer. For example, in the present case, a PCIe interface 8 or 16 bits wide may be used to communicate between the chip and computer, located on the same PCB. By locating the chip near the computer, and using a parallel data interface, the need to have serializer/deserializer hardware at a chip located far from the computer may be eliminated. Moreover, locating the chip near the computer also eliminates the driver and receiver circuits required to reliably send high-speed signals over a long metallic cable (in instances where the chip is not located near the computer).

Furthermore, a metallic cable (such as what would be used when the chip is located away from the computer) can be susceptible to both emitting and receiving electromagnetic interference across a wide range of frequencies, which other equipment, on or off the vehicle, may also emit or be susceptible to. The present dielectric waveguide, on the other hand, can be impervious to interference at frequencies less than tens of Gigahertz (GHz), and might not act as an antenna to radiate undesired energy from the computer, which is a common problem with metallic cables in general. Thus, the presently disclosed dielectric waveguide allows the system to perform better in terms of electromagnetic compatibility (EMC) performance.

Moreover, because high-speed signals can be sent over the dielectric waveguide cable with reduced interference as discussed above, the dielectric waveguide cable can facilitate faster data transmission rates (e.g., multiple gigabits per second, such as a 5 gigabit per second PRBS31 signal), thereby improving the quality and efficiency of two-way communication between the sensor unit and the vehicle.

An example autonomous vehicle is described below in connection with FIGS. 1-2, while an example communication system is described below in connection with FIGS. 3, 4, 5, and 6.

II. Example Autonomous Vehicle System

In example embodiments, an example autonomous vehicle system may include one or more processors, one or more forms of memory, one or more input devices/interfaces, one or more output devices/interfaces, and machine-readable instructions that when executed by the one or more processors cause the system to carry out the various functions, tasks, capabilities, etc., described above.

Example systems within the scope of the present disclosure will be described in greater detail below. An example system may be implemented in, or may take the form of, an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

Figure 1:
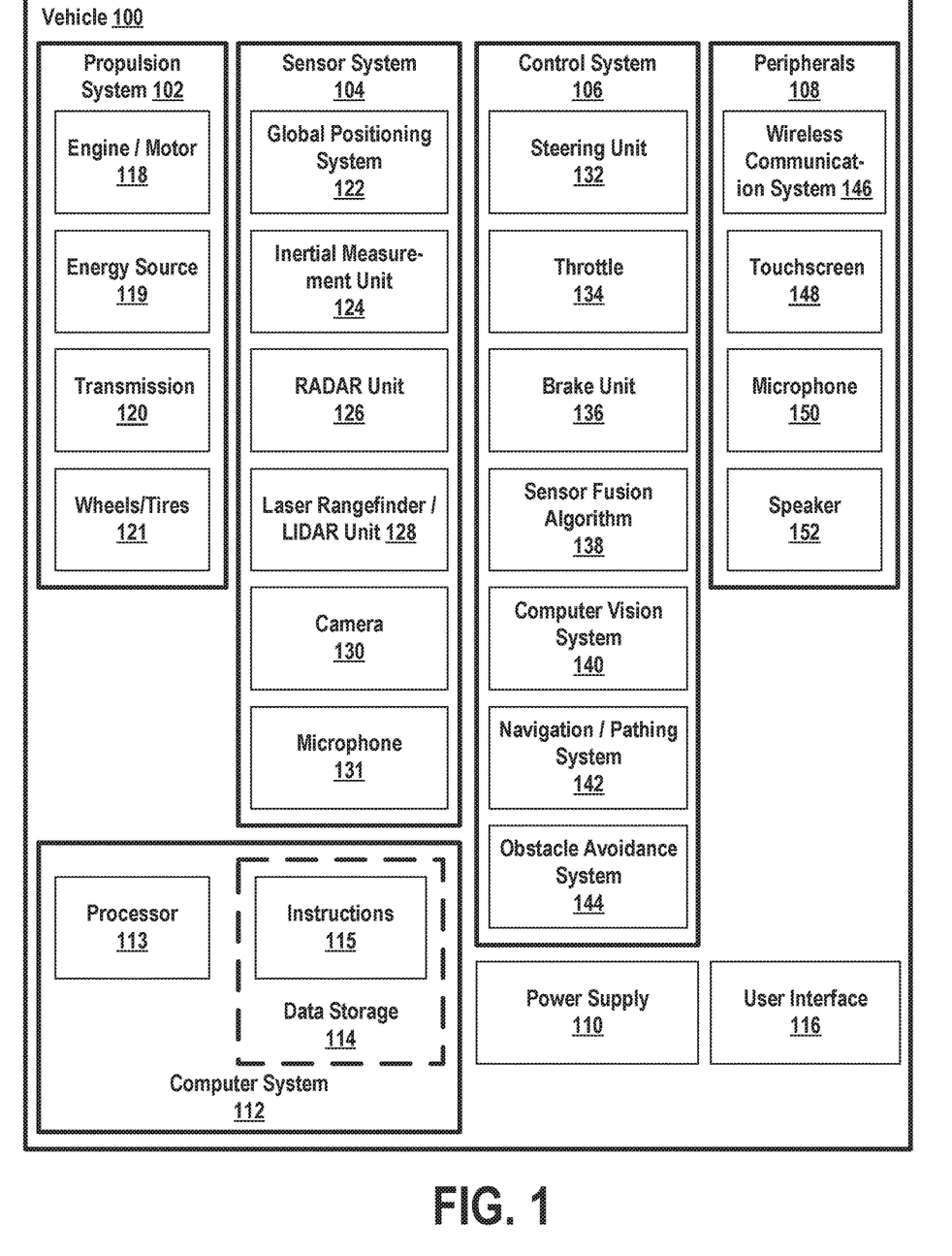
FIG. 1 is a functional block diagram depicting aspects of an example autonomous vehicle.

FIG. 1 is a functional block diagram illustrating a vehicle 100 according to an example embodiment. The vehicle 100 is configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from one or more sensor systems 104, and base one or more control processes (such as setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, a sensor system 104, a control system 106, one or more peripherals 108, a power supply 110, a computer system 112, and a user interface 116. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments, the propulsion system 102 includes an engine/motor 118, an energy source 119, a transmission 120, and wheels/tires 121. The engine/motor 118 converts energy source 119 to mechanical energy. In some embodiments, the propulsion system 102 can optionally include one or both of engines and/or motors. For example, a gas-electric hybrid vehicle can include both a gasoline/diesel engine and an electric motor.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 122, an inertial measurement unit (IMU) 124, a radar unit 126, a laser rangefinder/LIDAR unit 128, a camera 130, and/or a microphone 131. The sensor system 104 could also include sensors configured to monitor internal systems of the vehicle 100 (e.g., $O_2$ monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 122 is a sensor configured to estimate a geographic location of the vehicle 100. To this end, GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on inertial acceleration.

The radar unit 126 can represent a system that utilizes radio signals to sense objects within the local environment of the vehicle 100. In some embodiments, in addition to sensing the objects, the radar unit 126 and/or the computer system 112 can additionally be configured to sense the speed and/or heading of the objects. The radar unit 126 may include any antenna(s), waveguide networks, communication chip(s), and/or other components that may facilitate radar operation.

Similarly, the laser rangefinder or LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture a plurality of images of the environment surrounding the vehicle 100. The camera 130 can be a still camera or a video camera. In some embodiments, the camera 130 can be mechanically movable such as by rotating and/or tilting a platform to which the camera is mounted. As such, a control process of vehicle 100 may be implemented to control the movement of camera 130.

The sensor system 104 can also include a microphone 131. The microphone 131 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, throttle 134, brake unit 136, a sensor fusion algorithm 138, a computer vision system 140, a navigation/pathing system 142, and/or an obstacle avoidance system 144, etc.

The steering unit 132 is operable to adjust the heading of vehicle 100. For example, the steering unit can adjust the axis (or axes) of one or more of the wheels/tires 121 so as to effect turning of the vehicle. The throttle 134 is configured to control, for instance, the operating speed of the engine/motor 118 and, in turn, adjust forward acceleration of the vehicle 100 via the transmission 120 and wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include, for example, a Kalman filter, Bayesian network, etc. The sensor fusion algorithm 138 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 140 can process and analyze images captured by camera 130 to identify objects and/or features in the environment surrounding vehicle 100. The detected features/objects can include traffic signals, roadway boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation and pathing system 142 is configured to determine a driving path for the vehicle 100. For example, the navigation and pathing system 142 can determine a series of speeds and directional headings to effect movement of the vehicle along a path that substantially avoids perceived obstacles while generally advancing the vehicle along a roadway-based path leading to an ultimate destination, which can be set according to user inputs via the user interface 116, for example. The navigation and pathing system 142 can additionally be configured to update the driving path dynamically while the vehicle 100 is in operation on the basis of perceived obstacles, traffic patterns, weather/road conditions, etc. In some embodiments, the navigation and pathing system 142 can be configured to incorporate data from the sensor fusion algorithm 138, the GPS 122, and one or more predetermined maps so as to determine the driving path for vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from a user of the vehicle 100. Similarly, the speakers 152 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as Code-Division Multiple Access (CDMA), Evolution-Data Optimized (EVDO), Global System for Mobile communications (GSM)/General Packet Radio Surface (GPRS), and/or 4G cellular communication, such as Worldwide Interoperability for Microwave Access (WiMAX) or Long-Term Evolution (LTE). Additionally or alternatively, wireless communication system 146 can communicate with a wireless local area network (WLAN), for example, using WiFi. In some embodiments, wireless communication system 146 could communicate directly with a device, for example, using an infrared link, Bluetooth®, and/or Zig-Bee®. The wireless communication system 146 can include one or more dedicated short-range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of vehicle 100, such as electronics in the peripherals 108, computer system 112, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 119 can be implemented together, as in some all-electric cars.

Many or all of the functions of vehicle 100 can be controlled via computer system 112 that receives inputs from the sensor system 104, peripherals 108, etc., and communicates appropriate control signals to the propulsion system 102, control system 106, peripherals 108, etc. to effect automatic operation of the vehicle 100 based on its surroundings. Computer system 112 includes at least one processor 113 (which can include at least one microprocessor) that executes instructions 115 stored in a non-transitory computer readable medium, such as the data storage 114. The computer system 112 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from, a user of vehicle 100, such as an occupant in a passenger cabin of the vehicle 100. The user interface 116 can accordingly include one or more input/output devices within the set of peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in data storage 114, and/or by other techniques.

Although the vehicle 100 is described and shown in FIG. 1 as having various components of vehicle 100, e.g., wireless communication system 146, computer system 112, data storage 114, and user interface 116, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

The example vehicle 200 includes a sensor unit 202, a wireless communication system 204, RADAR units 206, laser rangefinder units 208, and a camera 210. Furthermore, the example vehicle 200 can include any of the components described in connection with vehicle 100 of FIG. 1. The RADAR unit 206 and/or laser rangefinder unit 208 can actively scan the surrounding environment for the presence of potential obstacles and can be similar to the RADAR unit 126 and/or laser rangefinder/LIDAR unit 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, RADARs, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include RADAR unit 206 and laser rangefinder unit 208. Furthermore, each sensor of sensor unit 202 can be configured to be moved or scanned independently of other sensors of sensor unit 202.

In an example configuration, one or more RADAR scanners (e.g., the RADAR unit 206) can be located near the front of the vehicle 200, to actively scan the region in front of the car 200 for the presence of radio-reflective objects. A RADAR scanner can be situated, for example, in a location suitable to illuminate a region including a forward-moving path of the vehicle 200 without occlusion by other features of the vehicle 200. For example, a RADAR scanner can be situated to be embedded and/or mounted in or near the front bumper, front headlights, cowl, and/or hood, etc. Furthermore, one or more additional RADAR scanning devices can be located to actively scan the side and/or rear of the vehicle 200 for the presence of radio-reflective objects, such as by including such devices in or near the rear bumper, side panels, rocker panels, and/or undercarriage, etc.

Figure 2:
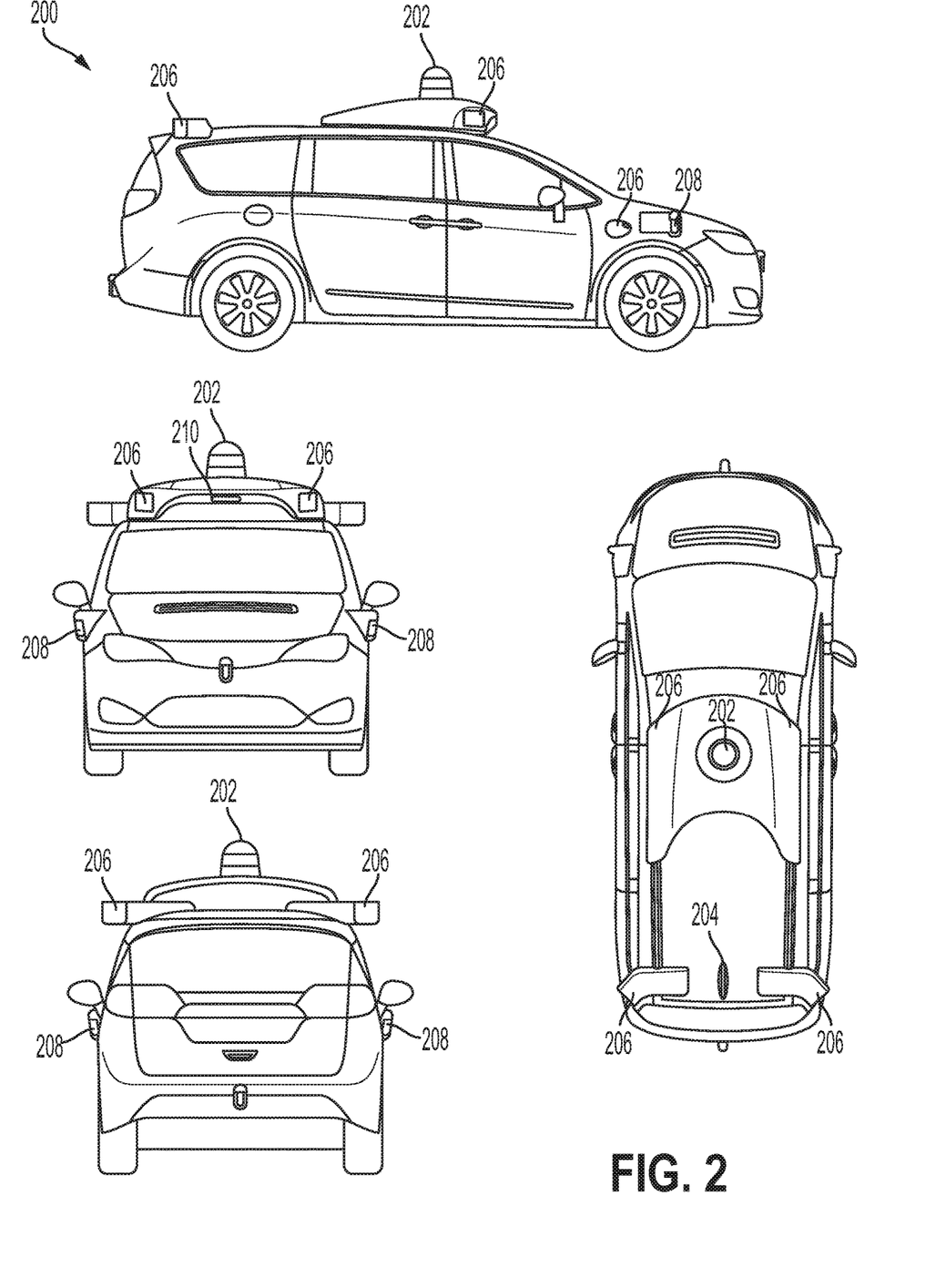
FIG. 2 depicts multiple exterior views of an example autonomous vehicle.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 can be a photo-sensitive instrument, such as a still camera, a video camera, etc. that is configured to capture a plurality of images of the environment of the vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 can provide range information by using a structured light technique in which the vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements.

The camera 210 can be mounted inside a front windshield of the vehicle 200. Specifically, the camera 210 can be situated to capture images from a forward-looking view with respect to the orientation of the vehicle 200. Other mounting locations and viewing angles of camera 210 can also be used, either inside or outside the vehicle 200. Further, the camera 210 can have associated optics operable to provide an adjustable field of view. Further, the camera 210 can be mounted to vehicle 200 with a movable mount to vary a pointing angle of the camera 210, such as via a pan/tilt mechanism.

III. Example Communication System

The disclosed communication system will now be described in more detail with respect to FIGS. 3, 4, 5, and 6.

Figure 3:
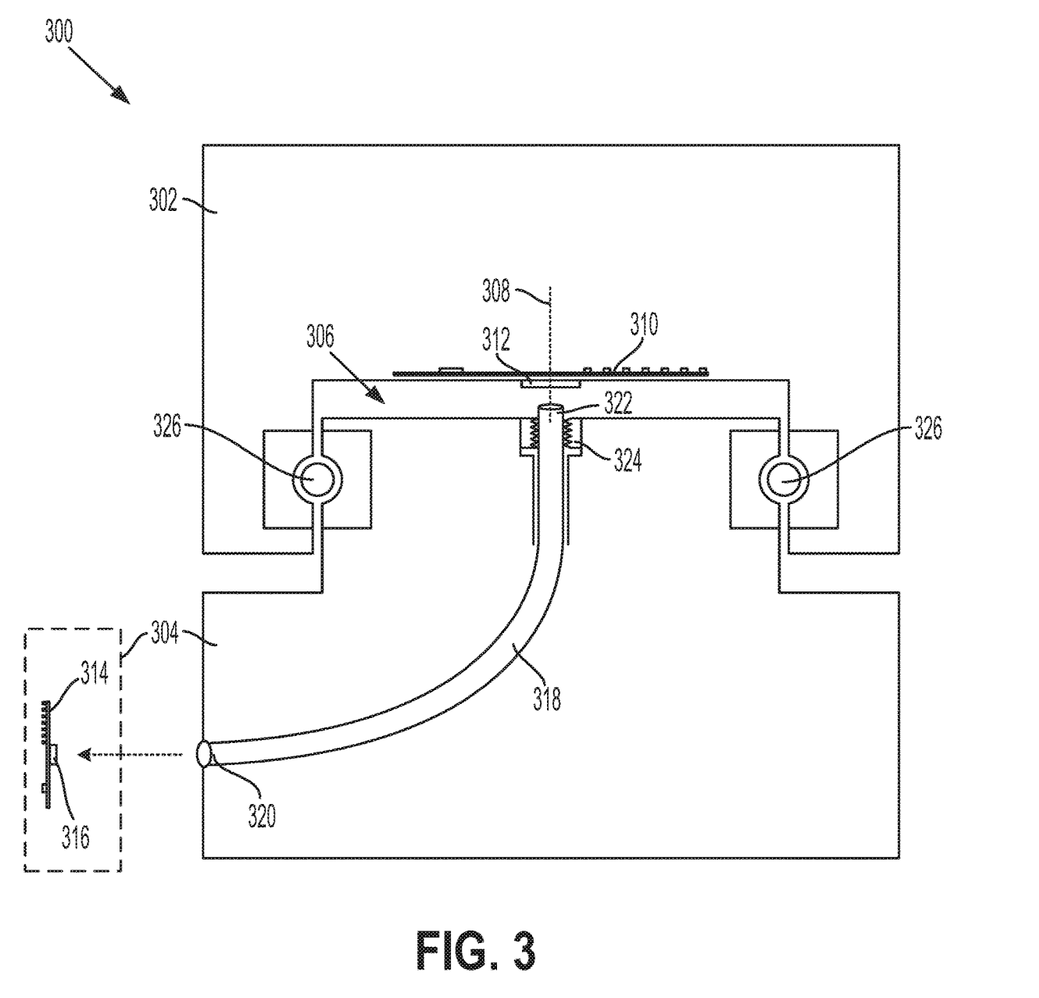
FIG. 3 illustrates an example communication system.

FIG. 3 illustrates an example communication system 300. The communication system 300 can include a first communication unit 302 (which will also be referred to as "sensor unit 302"), a second communication unit 304 (which will also be referred to as "vehicle-side unit 304"), and a rotary joint 306. The rotary joint 306 can be configured to enable the sensor unit 302 to rotate with respect to the vehicle-side unit 304 about an axis of rotation 308 of the communication system 300 and can allow electromagnetic signals to propage between the sensor unit 302 and the vehicle-side unit 304 without resulting in an undesirable degree of signal loss.

The sensor unit 302 can include a first set of one or more communication chips including a first antenna. As a representative example shown in FIG. 3, the sensor unit 302 can include a first communication chip 310, which includes a first antenna 312. The first communication chip 310 can be positioned and coupled to a location at the sensor unit 302 such that the axis of rotation 308 of the communication system 300 is substantially aligned with the center of the first antenna 312 (i.e., the first antenna 312 rotates about the axis of rotation 308).

The vehicle-side unit 304 can include a second set of one or more communication chips including a second antenna. As a representative example shown in FIG. 3, the vehicle-side unit 304 can include a second communication chip 314, which includes a second antenna 316. In practice, the second communication chip 314 can be affixed or otherwise coupled to a surface (not shown) on the vehicle side of the communication system 300.

The first communication chip 310, the second communication chip 314, and/or any other chips present as part of the communication system 300 can be configured to perform RF-to-electrical conversion and electrical-to-RF conversion.

Although each of the sensor unit 302 and the vehicle-side unit 304 are shown and described as having communication chip(s), it should be understood that, in other embodiments, communication between the sensor unit 302 and the vehicle-side unit 304 (i.e., between the first antenna 312 and the second antenna 316) can occur using other electronic devices and without the use of such chips.

The communication system 300 can be configured to enable two-way communication of electromagnetic signals between the sensor unit 302 and the vehicle-side unit 304. In practice, the electromagnetic signals may be used as part of the pathway to communicate between a sensor data processor (not shown) on the vehicle and a sensor (not shown) on the sensor unit. To facilitate this, the first antenna 312 can be configured for use by the first communication chip 310 to communicate electromagnetic signals out of and into the first communication chip 310. Similarly, the second antenna 316 can be configured for use by the second communication chip 314 to communicate electromagnetic signals out of and into the second communication chip 314. Often, and especially at radio frequencies, the interface to and from a communication chip such as these can be inefficient and or difficult to design. Therefore, to improve chip communications, a respective communication chip can include one or more antennas, such as the first antenna 312 or the second antenna 316, that can communicate signals to, and receive signals from, components external to the communication chip, such as signals communicated between the sensor unit 302 and the vehicle-side unit 304.

The first communication chip 310 and/or the second communication chip 314 (and thus, the first antenna 312 and the second antenna 316) can be coupled directly to, or proximate to (e.g., within millimeters of), a respective processor or processors (not shown). For example, the first communication chip 310 can be part of a LIDAR sensor of the sensor unit 302 and can be coupled to a first processor associated with the LIDAR sensor. Similarly, the second communication chip 314 can be coupled to a second processor that is part of a LIDAR processing system of the vehicle-side unit 304. The first processor can be configured to convert and otherwise process signals received from the second communication chip 314, such as signals instructing the LIDAR sensor to obtain LIDAR data. The second processor can be configured to convert and otherwise process signals received from the first communication chip 310, such as signals representative of obtained LIDAR data. Thus, two-way communication of LIDAR signals between the sensor unit 302 and the vehicle-side unit 304 can be possible.

As further shown, the vehicle-side unit 304 can include a dielectric waveguide cable 318 extending from the second communication chip 314 to the rotary joint 306. The dielectric waveguide cable 318 can be comprised of plastic, polytetrafluoroethylene, and/or other dielectric materials, one or more of which can be flexible. In operation, the dielectric waveguide cable 318 can function as a waveguide that carries signals to and from the second communication chip 314 between the rotary joint 306 and the second antenna 316. To increase reliability of the communication system 300 and reduce the chances of signal discontinuity, the dielectric waveguide cable 318 can, in some examples, include a first dielectric material sheathed in a second dielectric material, where the first and second dielectric materials are different dielectric materials and the second dielectric material can be selected to provide internal reflection of electromagnetic signals within the dielectric waveguide cable 318. In some examples, the first dielectric material and/or the second dielectric material can comprise plastic. In practice, when the diameter of the dielectric waveguide cable 318 is significantly less than the wavelength of the signal propagating down the dielectric waveguide cable 318, generally only a single mode of propagation is supported. The basic constraints on the dielectric constants (or indices of refraction) is that the core material has a higher dielectric constant than the cladding. Therefore, in some examples, a bare Teflon (PTFE) rod in air can be effective for the dielectric cable. As another example, polyethylene has a dielectric constant of about 2.3 and PTFE has a dielectric constant of about 2.0, so in principle, polyethylene clad in PTFE can be used. As yet another example, PVC has a dielectric constant of about 3.0, so PVC may also be used as the dielectric waveguide cable 318. Additionally, there are other factors, such as energy absorption by the materials, that can come in to play as well. For example, it is generally desirable to have a material that absorbs a low amount of energy at the frequencies of operation. There are many different materials and combinations of materials that may be used to form the dielectric waveguide cable 318.

The dielectric waveguide cable 318 can vary in length depending on various factors such as the size of the vehicle and a location of the second communication chip 314. In one application, the dielectric waveguide cable 318 can be at least 1.5 m in length, though other lengths may be used as well. Generally, the present disclosure may be more advantages as cable lengths increase (as compared to running metal traces). Further, in some examples, the dielectric waveguide cable 318 can take the form of an optical fiber cable.

As further shown, the dielectric waveguide cable 318 can include a proximal end 320 and a distal end 322, each of which includes a respective aperture through which signals can pass. The proximal end 320 of the dielectric waveguide cable 318 can be coupled to the second communication chip 314. The manner in which the proximal end 320 is coupled to the second communication chip 314 can take various forms, such as that of an RF coupling and/or a physical connection. An RF coupling can take the form of an antenna, an open ended waveguide, or other structure capable of coupling RF energy. A physical connection can take the form of an abutment of the dielectric waveguide cable 318 to a port of the communication chip, or other physical connection. The coupling of the proximal end 320 to the second communication chip 314 can enable electromagnetic energy to be directly harvested from the second communication chip 314 via the dielectric waveguide cable 318.

The distal end 322 of the dielectric waveguide cable 318 can be affixed to the vehicle-side unit 304 at a location bordering a space defined by the rotary joint 306. The distal end 322 can be affixed using a fastening device 324 such as a mechanical clamp, screw, and/or other type of fastening device. In some examples, the fastening device 324 can be comprised of a dielectric material such as plastic.

The distal end 322 of the dielectric waveguide cable 318 can be fastened in such a way that rotation of the sensor unit 302 with respect to the vehicle-side unit 304 does not cause the dielectric waveguide cable 318 to rotate. Further, the distal end 322 of the dielectric waveguide cable 318 can be fastened and positioned in such a way that an axis of the distal end 322 (e.g., an axis running through the center of the distal end 322) is substantially aligned with the axis of rotation 308 of the communication system 300. Because the axis of the distal end 322, the center of the first antenna 312, and the axis of rotation 308 can be substantially aligned, the dotted line designating the axis of rotation 308 in FIG. 3 can represent the axis about which the distal end 322 and the first antenna 312 can rotate during operating of the communication system 300.

In some examples, the distal end 322 can be positioned and affixed in such a way that the location of the aperture at the distal end 322 borders the space defined by the rotary joint 306 (e.g., such that the aperture and an adjacent surface of the vehicle-side unit 304 are substantially flush). Alternatively, and as shown in FIG. 3 by way of example, the distal end 322 can be positioned and affixed in such a way that the location of the aperture at the distal end 322 is within the space defined by the rotary joint 306. Regardless of whether the aperture is bordering or within the space defined by the rotary joint 306, the distal end 322 can be positioned such that the distal end 322 is located within a predetermined distance of the first antenna 312, such as approximately 2 mm from the first antenna 312. Having the distal end 322 closer to the first antenna 312 can reduce the chance of signal interference within the rotary joint 306, yet still allow for rotation of the sensor unit 302 without rotation of the dielectric waveguide cable 318.

As noted above, the dielectric waveguide cable 318 can usefully move the burden of electrical-to-RF and RF-to-electrical conversion away from the rotary joint because the second communication chip 314, and thus, the second antenna 316, can be located at (e.g., on or inside) vehicle-side processors (e.g., processors that are included as part of the control system 106 shown in FIG. 1, such as the computer vision system 140). Thus, communication from the sensor unit 302 to the vehicle-side unit 304 (or vice versa) can eliminate the need for such conversions to occur near the rotary joint 306. Additionally, as noted above, signals carried between the first communication chip 310 and the second communication chip 314 can propagate with minimal or no interference throughout the length of the dielectric waveguide cable 318.

As further shown, the rotary joint 306 can include bearings 326, each of which can be mounted to the sensor unit 302 on one side of the bearing and mounted to the vehicle-side unit 304 on another side of the bearing. As so arranged, the bearings 326 can enable the rotation of the sensor unit 302 with respect to the vehicle-side unit 304. The bearings 326 are one example of a possible bearing for the present system, other shapes, sizes, and configurations of bearings are possible as well. Additionally or alternatively, the rotary joint 306 can include other physical components, such as bearing sleeves, slip rings, etc. that can help enable rotation of the sensor unit 302 with respect to the vehicle-side unit 304 and propagation of signals between the sensor unit 302 and the vehicle-side unit 304.

As further shown, the rotary joint 306 can also include an air gap formed between the sensor unit 302 and the vehicle-side unit 304. The air gap may be approximately 1-3 mm, or may be outside of that range. During the operation of the communication system 300, vibrations and the rotation of the sensor unit 302 can cause the spacing of the air gap and the alignment of the distal end 322 and the first antenna 312 to change. As such, components of the communication system 300 can be tuned to maximize electrical coupling while making the coupling functionally independent or insensitive to gaps variations and rotations.

To address any potential cross-polarization that might result due to rotation of the sensor unit 302 (and thus, of the first antenna 312), the first antenna 312 and/or the second antenna 316 can be configured to produce circularly-polarized electromagnetic signals.

In example operation of the communication system 300, the first antenna 312 can transmit first electromagnetic signals to the second antenna 316. In particular, the first electromagnetic signals transmitted by the first antenna 312 can propagate across the rotary joint 306 and then enter the distal end 322 of the dielectric waveguide cable 318. In other words, the first electromagnetic signals might not propagate through any other medium (e.g., an intermediate waveguide structure) between the rotary joint 306 and the dielectric waveguide cable 318, and can instead enter the dielectric waveguide cable 318 following propagation across the rotary joint 306. In some implementations, the first electromagnetic signals might enter the dielectric waveguide cable 318 directly following propagation across the rotary joint 306. After entering the dielectric waveguide cable 318, the first electromagnetic signals can propagate through the dielectric waveguide cable 318, exit the proximal end 320, and be received by the second antenna 316.

Similarly, the second antenna 316 can transmit second electromagnetic signals to the first antenna 312. In particular, the second antenna 316 can transmit the second electromagnetic signals into the proximal end 320 of the dielectric waveguide cable 318. After entering the dielectric waveguide cable 318, the second electromagnetic signals can propagate through the dielectric waveguide cable 318. The second electromagnetic signals can then exit the distal end 322 into the rotary joint 306, propagate across the rotary joint 306, and be received by the first antenna 312. In some implementations, the second electromagnetic signals might exit the distal end 322 directly into the rotary joint 306. Other examples operations are possible as well.

As noted above, an axis of the distal end 322 of the dielectric waveguide cable 318 and the center of the first antenna 312 can both be substantially aligned with the axis of the rotation 308 of the communication system 300. Thus, the sensor unit 302 and the vehicle-side unit 304 can remain in communication irrespective of the rotation of one side with respect to the other.

In some embodiments, the dielectric waveguide cable 318 can include, at the proximal end 320 and/or the distal end 322, a waveguide launching structure. In some examples, the launching structure may simply be the open end of the waveguide. In other examples, an antenna, or antenna like structure, such as a horn, may be coupled to the end of the waveguide. In some examples, an optimized launch structure could be a structure that matches the field of the antenna to the propagation mode of the waveguide. This could, for example, take the form of a dielectric lens. In some launch structures, it may be advantageous to taper the end of the waveguide to form a cone. Other possible launch structures are possible.

Figure 4:
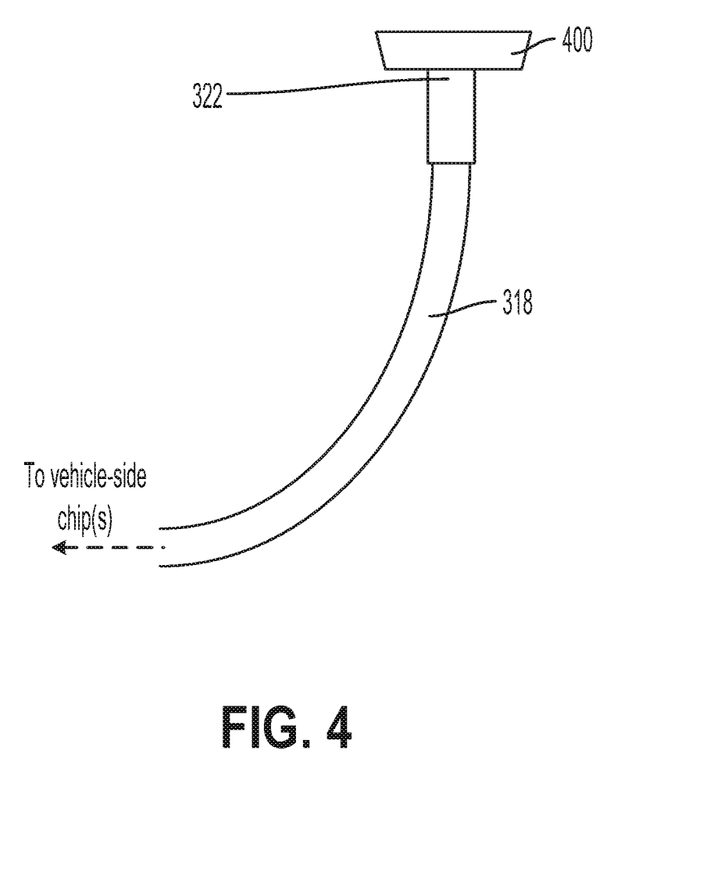
FIG. 4 illustrates a portion of an example dielectric waveguide cable.

FIG. 4 illustrates a portion of the dielectric waveguide cable 318 that includes, at the distal end 322, an example waveguide launching structure 400.

Figure 5:
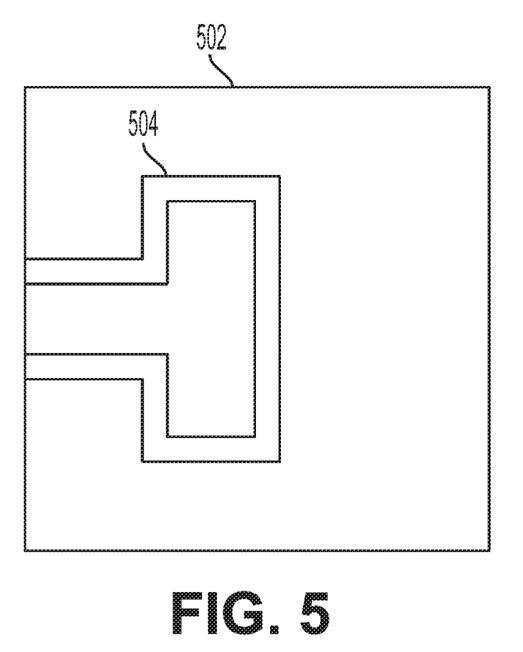
FIG. 5 illustrates an example microchip having an antenna.

FIG. 5 illustrates an example microchip 502 having an antenna 504. The antenna 504 may be used by the microchip 502 to communicate signals out of and into the microchip 502. In some examples, the first communication chip 310 and/or the second communication chip 314 of FIG. 3 can take the form of microchip 502.

Many variations on the above-described implementations are possible as well, each advantageously and reliably providing communications between the vehicle and the sensor unit.

Figure 6:
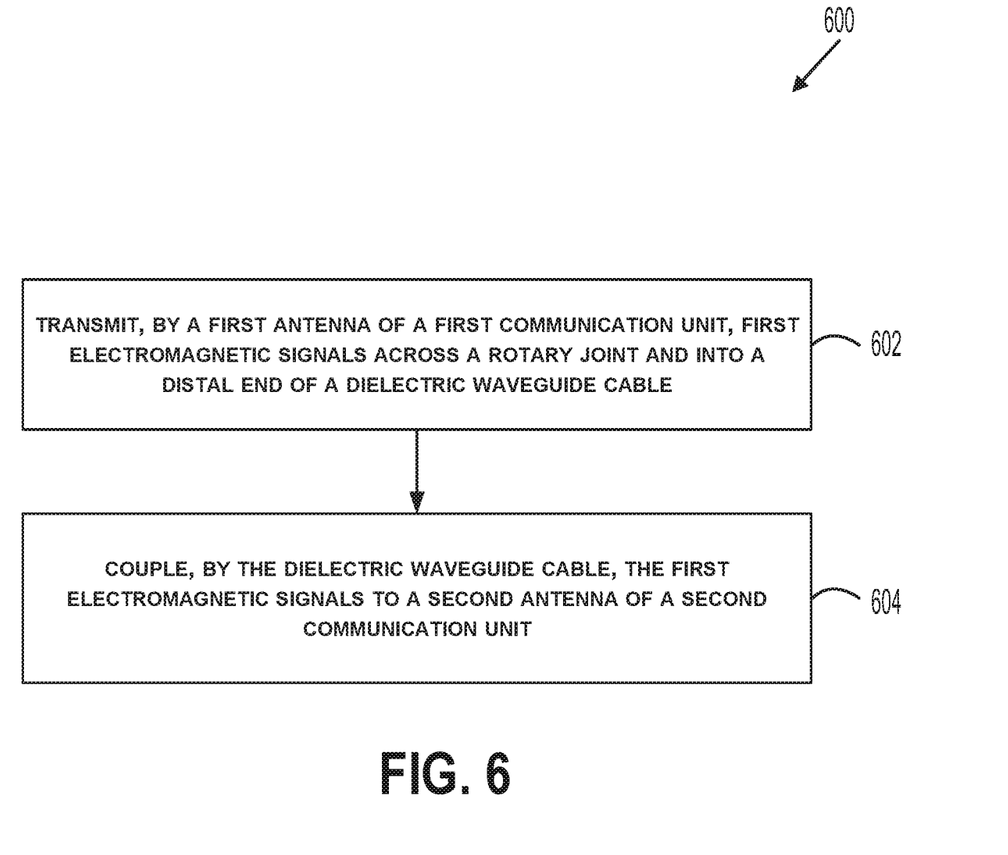
FIG. 6 illustrates an example method.

FIG. 6 illustrates an example method 600. At block 602, the method includes transmitting, by a first antenna of a first communication unit, first electromagnetic signals across a rotary joint and into a distal end of a dielectric waveguide cable. The dielectric waveguide cable can extend from the rotary joint to a second antenna of the second communication unit. A proximal end of the dielectric waveguide cable can be coupled to the second antenna and the distal end of the dielectric waveguide cable can be affixed to the second communication unit at a location bordering a space defined by the rotary joint.

At block 604, the method includes coupling, by the dielectric waveguide cable, the first electromagnetic signals to a second antenna of the second set of one or more communication chips.

Therefore, method 600 can enable vehicle-side components (e.g., the second communication chip 314 in FIG. 3) to be in RF communication with sensor-side components (e.g., the first communication chip 310 in FIG. 3), while minimizing interference and moving the burden of RF-to-electrical and electrical-to-RF conversions away from the rotary joint.

In the example method 600, the first communication unit (e.g., a first set of one or more communication chips) and a second communication unit (e.g., a second set of one or more communication chips) can be configured to engage in two-way communication with each other. In addition, the rotary joint can be configured to enable the first communication unit to rotate with respect to the second communication unit about an axis of rotation, and an axis of the distal end of the dielectric waveguide cable can be substantially aligned with the axis of rotation. In some examples, the center of the first antenna can be substantially aligned with the axis of rotation as well.

In some embodiments, the example method 600 can further include transmitting, by the second antenna, second electromagnetic signals into the proximal end of the dielectric waveguide cable. Further, the example method 600 can also include coupling, by the dielectric waveguide cable, the second electromagnetic signals into the rotary joint, whereby the second electromagnetic signals exit the distal end of the dielectric waveguide cable into the rotary joint and propagate across the rotary joint to the first antenna.

In some embodiments, the first communication unit can include a sensor unit rotationally mounted to a vehicle and the vehicle can include the second communication unit.

In some embodiments, the first antenna can be communicatively coupled to a LIDAR sensor included in the sensor unit.

In some embodiments, the dielectric waveguide cable can include a first dielectric material sheathed in a second dielectric material different from the first dielectric material, where the second dielectric material is selected to provide internal reflection of the first electromagnetic signals within the dielectric waveguide cable. In some examples, one or more of the first dielectric material or the second dielectric material can comprise plastic.

In some embodiments, the distal end of the dielectric waveguide cable can be located between approximately 0.2 mm and approximately 0.5 mm from the first antenna.

In some embodiments, the act of transmitting the first electromagnetic signals can involve transmitting circularly-polarized electromagnetic signals.

In some embodiments, the first electromagnetic signals can have a frequency between 50 and 100 Gigahertz.

By the term "substantially," "approximately," or "about" used herein, it is meant that the recited characteristic, parameter, value, or geometric planarity need not be achieved exactly, but that deviations or variations, including for example, tolerances, measurement error, measurement accuracy limitations and other factors known to skill in the art, may occur in amounts that do not preclude the effect the characteristic was intended to provide.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A communication system comprising:
a first communication unit;
a second communication unit; and
a rotary joint configured to enable the first communication unit to rotate with respect to the second communication unit,
wherein the first communication unit comprises a first antenna,
wherein the second communication unit comprises:
 a second antenna, and
 a dielectric waveguide cable extending from the second antenna to the rotary joint, wherein a proximal end of the dielectric waveguide cable is coupled to the second antenna and a distal end of the dielectric waveguide cable is coupled to the second communication unit,
wherein the first communication unit and the second communication unit are configured to engage in communication with each other across the rotary joint, and
wherein an axis of the distal end of the dielectric waveguide cable is substantially aligned with an axis of rotation of the communication system.

2. The communication system of claim 1, wherein the distal end of the dielectric waveguide cable is coupled to the second communication unit at a location bordering a space defined by the rotary joint.

3. The communication system of claim 1, wherein the distal end of the dielectric waveguide cable is coupled to the second communication unit at a location within a space defined by the rotary joint.

4. The communication system of claim 1, wherein electromagnetic signals transmitted from the first antenna to the second antenna enter the distal end of the dielectric waveguide cable following propagation of the electromagnetic signals across the rotary joint.

5. The communication system of claim 1, wherein electromagnetic signals transmitted from the second antenna to the first antenna exit the distal end of the dielectric waveguide cable into the rotary joint.

6. The communication system of claim 1, wherein a vehicle comprises the second communication unit, and
wherein the communication system enables two-way communication between the vehicle and a sensor unit.

7. The communication system of claim 1, wherein the dielectric waveguide cable comprises a first dielectric material sheathed in a second dielectric material different from the first dielectric material, and
wherein the second dielectric material is selected to provide internal reflection of electromagnetic signals within the dielectric waveguide cable.

8. The communication system of claim 1, wherein one or more of the first antenna or the second antenna is configured to operate with a circular polarization.

9. The communication system of claim 1, wherein the center of the first antenna is substantially aligned with the axis of rotation of the communication system and the axis of the distal end of the dielectric waveguide cable.

10. The communication system of claim 1, wherein the first communication unit comprises a first set of one or more communication chips, the first set of communication chips including the first antenna, and
wherein the second communication unit comprises a second set of one or more communication chips, the second set of communication chips including the second antenna.

11. A method comprising:
transmitting, by a first antenna of a first communication unit, first electromagnetic signals across a rotary joint and into a distal end of a dielectric waveguide cable, wherein the dielectric waveguide cable extends from the rotary joint to a second antenna of a second communication unit, and wherein a proximal end of the dielectric waveguide cable is coupled to the second antenna and the distal end of the dielectric waveguide cable is coupled to the second communication unit; and
coupling, by the dielectric waveguide cable, the first electromagnetic signals to the second antenna,
wherein the first communication unit and the second communication unit are configured to engage in communication with each other, and
wherein the rotary joint is configured to enable the first communication unit to rotate with respect to the second communication unit about an axis of rotation, wherein an axis of the distal end of the dielectric waveguide cable is substantially aligned with the axis of rotation.

12. The method of claim 11, further comprising:
transmitting, by the second antenna, second electromagnetic signals into the proximal end of the dielectric waveguide cable; and
coupling, by the dielectric waveguide cable, the second electromagnetic signals into the rotary joint, whereby the second electromagnetic signals exit the distal end of the dielectric waveguide cable into the rotary joint and propagate across the rotary joint to the first antenna.

13. The method of claim 11, wherein the first communication unit comprises a sensor unit rotationally mounted to a vehicle, and
wherein the vehicle comprises the second communication unit.

14. The method of claim 11, wherein the dielectric waveguide cable comprises a first dielectric material sheathed in a second dielectric material different from the first dielectric material, and
wherein the second dielectric material is selected to provide internal reflection of the first electromagnetic signals within the dielectric waveguide cable.

15. The method of claim 11, wherein the distal end of the dielectric waveguide cable is coupled to the second communication unit at a location bordering a space defined by the rotary joint.

16. The method of claim 11, wherein the distal end of the dielectric waveguide cable is coupled to the second communication unit at a location within a space defined by the rotary joint.

17. A system comprising:
a sensor unit rotationally mounted to a vehicle;
a vehicle-side communication unit; and
a rotary joint configured to enable the sensor unit to rotate with respect to the vehicle-side communication unit about an axis of rotation,
wherein the sensor unit comprises a first antenna,
wherein the vehicle-side communication unit comprises:
a second antenna, and
a dielectric waveguide cable extending from the second antenna to the rotary joint, wherein a proximal end of the dielectric waveguide cable is coupled to the second antenna and a distal end of the dielectric waveguide cable is coupled to the vehicle-side communication unit,
wherein the vehicle-side communication unit and the sensor unit are configured to engage in communication with each other across the rotary joint, and
wherein an axis of the distal end of the dielectric waveguide cable is substantially aligned with the axis of rotation.

18. The system of claim 17, wherein electromagnetic signals transmitted from the first antenna to the second antenna enter the distal end of the dielectric waveguide cable following propagation of the first electromagnetic signals across the rotary joint.

19. The system of claim 17, wherein electromagnetic signals transmitted from the second antenna to the first antenna exit the distal end of the dielectric waveguide cable into the rotary joint.

20. The system of claim 17, wherein the distal end of the dielectric waveguide cable is coupled to the vehicle-side communication unit at a location within a space defined by the rotary joint.

* * * * *